June 16, 1936.  H. KILFITT  2,044,434
PHOTOGRAPHIC CAMERA
Filed June 24, 1935   2 Sheets-Sheet 1
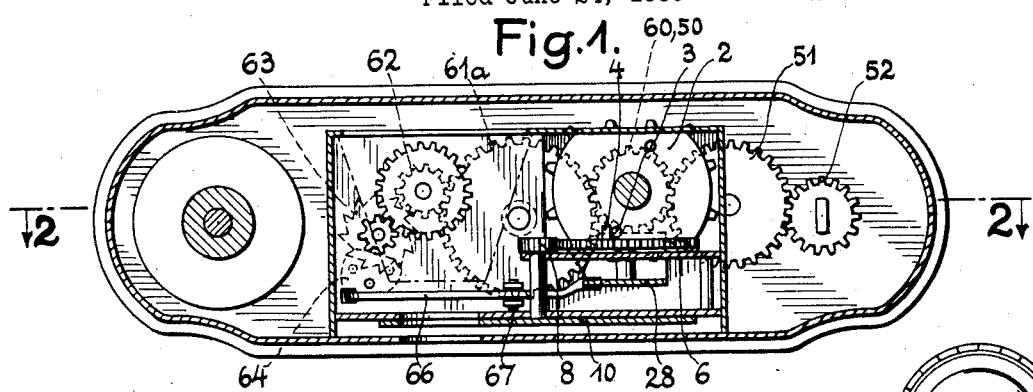
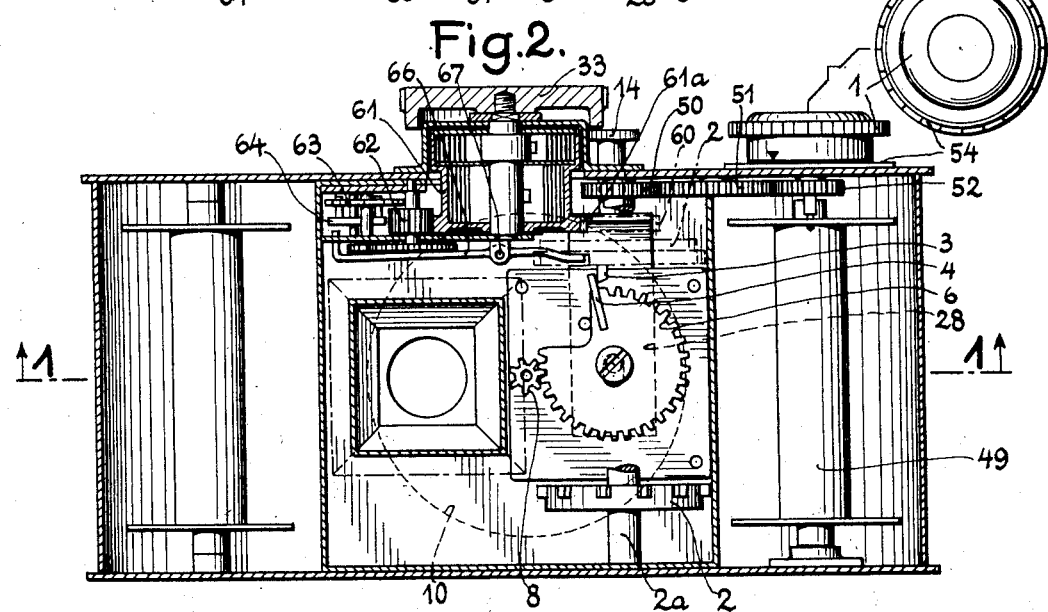
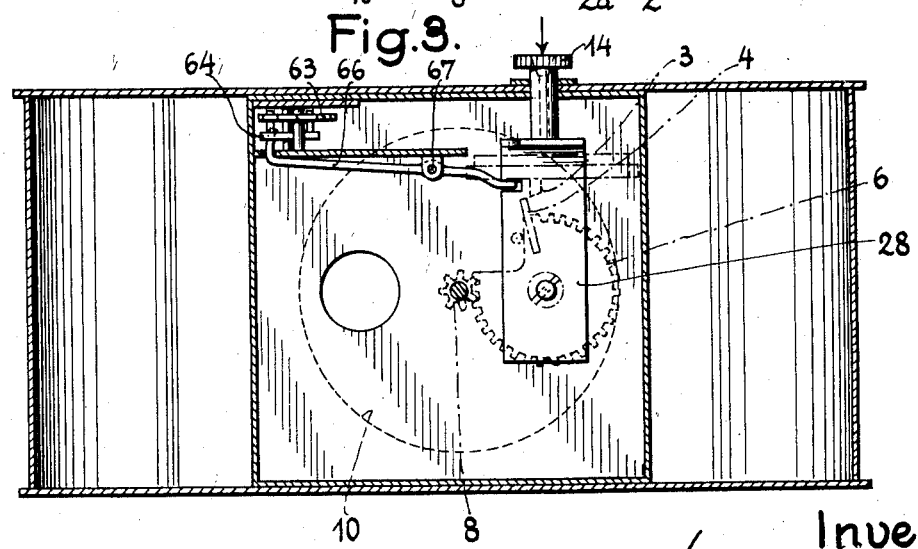
Inventor
Heinz Kilfitt
By *[signature]*
Attorney

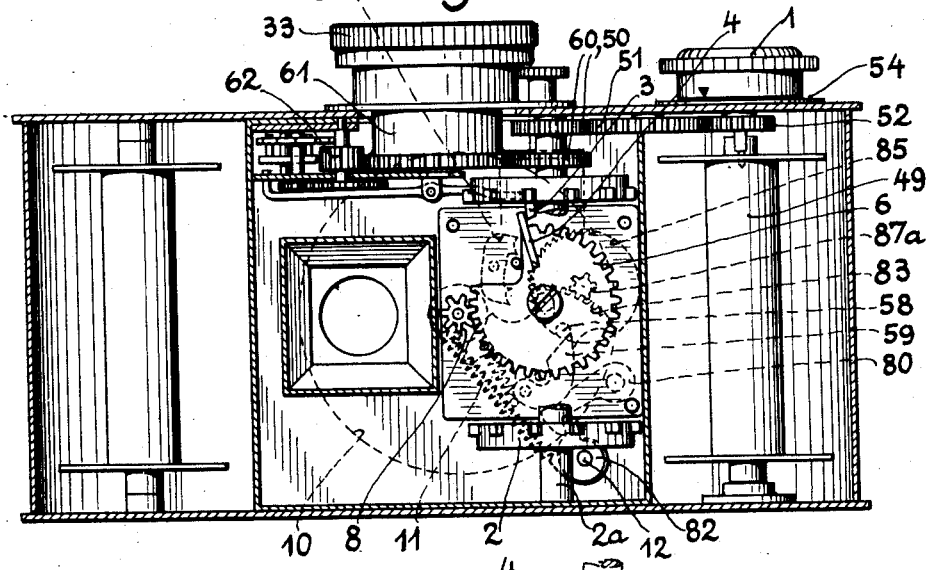
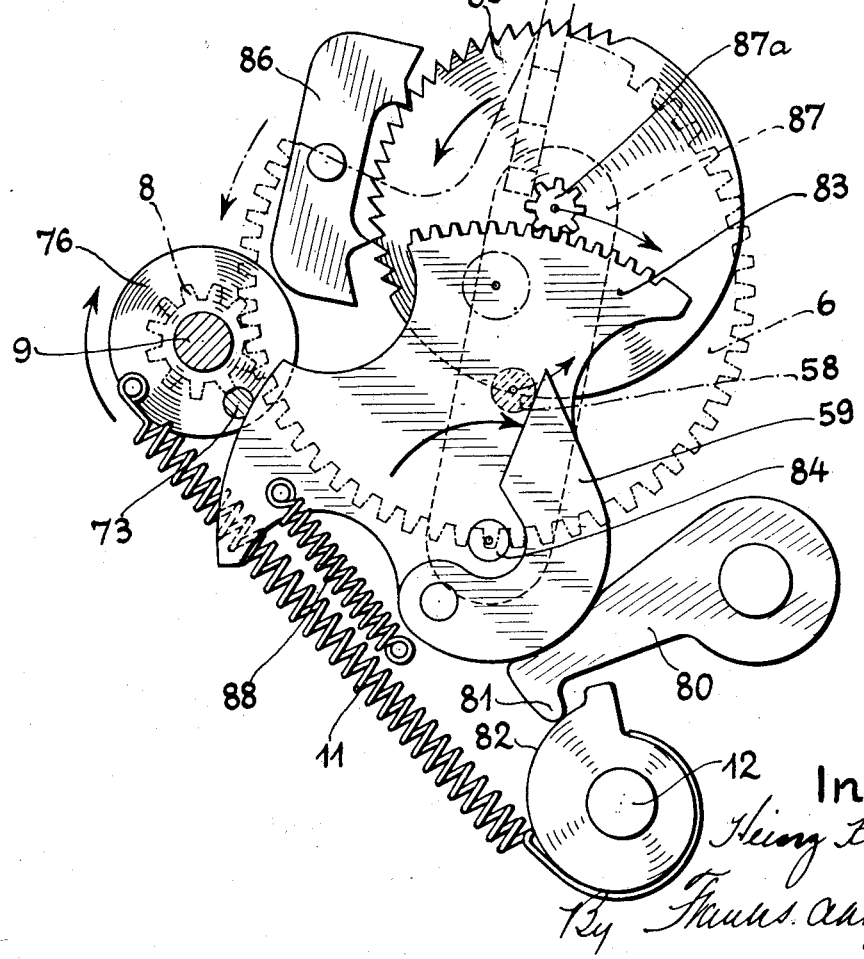

Patented June 16, 1936

2,044,434

UNITED STATES PATENT OFFICE 2,044,434

PHOTOGRAPHIC CAMERA

Heinz Kilfitt, Schwelm, Germany

Application June 24, 1935, Serial No. 28,175
In Germany February 14, 1934

16 Claims. (Cl. 95—31)

This invention consists in a photographic camera, in which the feed of the film is effected automatically by a spring mechanism and wherein the toothed discs of the film feed roller which are adapted to engage in the perforations of the film also effect through the intermediary of suitable elements, the tensioning of the shutter, the tensioning of the brake mechanism retarding the open position of the shutter and the drive of the counting mechanism showing the exposures which have taken place.

The invention further consists in that the fully automatic method of operation of the camera is attained with a minimum requirement of details and space, so that the camera is not only very stable, very reliable in operation and cheap to produce but is also very small.

Owing to the provision of this automatic drive, it is possible to hold the camera in front of the eyes during all the exposures, without having to move the film forward by hand after each exposure.

In the accompanying drawings:—

Fig. 1 is a horizontal section of the camera on the line I—I of Fig. 2,

Fig. 2 is a vertical section on the line 2—2 of Fig. 1,

Fig. 3 is a sectional view illustrating the brake device for the spring mechanism, Fig. 4 is a sectional view of the camera showing the spring driving mechanism and the brake mechanism for retarding the time of exposure, and Fig. 5 shows the brake mechanism to a larger scale.

The film feed roller (Figs. 1, 2), is not a hollow cylinder as has usually been the case but comprises two thin discs 2n mounted on a spindle 2a and provided with driving teeth. A locking or stop pin 3, secured on one of the discs 2 is adapted to engage behind a stop plate 4 which is rigidly secured on a mutilated gear wheel 6 having its teeth in mesh with a pinion 8 secured on the spindle 9 carrying the shutter disc 10. On the spindle 2a of the feed roller is secured a toothed wheel 60 meshing with teeth 61a on a spring casing 61 which teeth are also in mesh with a brake mechanism comprising an intermediate wheel 62, escapement wheel 63 and pallet 64.

Naturally, this braking mechanism can be constructed in any other suitable way, e. g., as a wheel or air-brake. It simply has the object of ensuring that the feed of the film takes place gently instead of suddenly.

The spring arranged in the spring casing is wound up by means of a ratchet and a winding key or knob 33 in any usual way.

In order not to enlarge the camera casing in spite of the space required by the spring casing, the latter is made in a special form. It is inserted from the outside through an opening in the camera wall and brought into engagement with the parts contained in the camera casing in such manner that a portion of the spring casing projects outside the wall, the externally located part having a larger diameter than the part inside. In the spring casing are then fitted two springs, of which one has a diameter approximately equal to or greater than that of the toothed rim 61a of the spring casing. Due to this arrangement of the spring casing, the brake for the regulation of the smooth and shockless running of the film feed also finds room and does not necessitate any enlargement of the camera casing. The brake device is located underneath the camera wall in the angle which is formed by the picture platform and the front and side walls, that is in a space which is also available in ordinary cameras but is not utilized. While this arrangement does not require any enlargement of the camera casing, it also affords the further advantage that the spring casing is easily accessible should a breakage of a spring take place. The externally located portion of the spring casing is covered by the part serving for the winding up, i. e., the winding knob 33. Owing to the externally located part of the spring casing having a larger diameter than the toothed rim, a stronger spring can be fitted and, in addition this spring has a better action since it has the effect of a longer lever arm or leverage.

When the spring is tensioned, the feed roller is rotated by the meshing of the spring casing with the wheel 60 and the locking pin 3 engages behind the stop plate 4 so that the mutilated gear wheel 6 is rotated and thereby through the pinion 8, the shutter disc 10. An opening formed in the shutter disc is consequently moved past the objective while a spring 11 connected to the shutter disc is tensioned. A cover flap, which is not shown on the drawings, prevents, however, an exposure taking place during this operation. The mutilated gear wheel 6 is then displaced in its bearings by exerting a pressure on the release knob 14 so that the stop plate 4 is moved out of engagement with the stop pin 3 and can slide back under the action of the spring 11 (Fig. 5) acting on the shutter disc. On the pressing of the release knob 14, the cover flap already mentioned (not shown) is simultaneously raised and the exposure now takes place on the springing back of the shutter disc 10. Since in this stop the stop pin 3 on the feed roller 2 meets with no resistance from the stop plate 4, the spring mechanism and with it the feed roller would run down unchecked. A simple arrangement, however, prevents this running down by ensuring that on the pressing down of the release knob 14, the spring mechanism will remain stationary and only the exposure will take place, and that on the rising or release of the knob 14, the film will only be fed forward by one picture length. A lever 66 is arranged to rock about a pivot 67 and engage by one arm in a recess formed in a slide 28 which is actuated by the release knob 14 to displace the mutilated gear wheel 6, as above described, out of the range of the stop pin 3. Now if the release knob 14 be pressed down for the purpose of making an exposure, the other end of the lever 66 is moved into the path of a nose piece fixed on the anchor 64, or of some other part of the brake device, to act as a detent preventing movement of the spring mechanism. On again letting go the release knob, that is, after the exposure has taken place, the brake device is again released at the highest point and now the pin fitted on the feed roller can engage the stop plate which is again forced up on letting go the release knob, and force this forward up to its stop. The movement of the film feed roller here corresponds to the length of a picture. The shutter is again tensioned, and the process can be repeated; pressing down of the release, locking of the brake arrangement thereby; at the lowest point: release of the shutter. On letting go the knob of the release 14, the release of the brake device, the running of the spring mechanism and the film feed roller, and the tensioning of the shutter.

The co-operation between the feed roller 2, the locking pin 3 and the stop plate 4 for the purpose of the film feed is at the same time utilized for the actuation of the parts which retard the running of the shutter plate during longer exposures. In Figures 4 and 5, these parts are shown—this time—brake mechanism is thus tensioned by the film feed itself by means of the mutilated gear wheel 6, which carries out a rocking movement, with each film feed.

On the underside of the gear wheel 6 is fixed a pin 58 which, on the pressing forward of the former by the film feeding means bears against the surface of a lever 59. The rounded outer edge or back of this lever is accommodated in a corresponding recess of a lever 80 which is in sliding contact at its nose 81 with a cam 82 secured on the spindle 12, which leads to the outside of the camera and by means of which the spring 11 can be tensioned to a greater or lesser extent. When the pin 58 comes into contact with the surface of the lever 59 and this cannot deflect due to its back bearing on the lever 80 which has been raised by the cam 81, a toothed segment 83 is compelled to rotate about its pivot 84 in the direction of the arrow and an escapement wheel 85 carrying a pinion 87a which meshes with the segment 83 is thereby rotated in the direction of the arrow. In this case, however, the pallet 86 is not also moved because the escapement wheel is mounted on a bridge 87 which is also adapted to oscillate about the pivot 84. On the oscillation of the toothed segment 83 in the direction of the arrow, the bridge 87 with the escapement wheel 85 is simultaneously brought in the same direction (up to a stop) out of the range of the pallet. If now the release operation takes place in which the stop plate 4 slides off the pin of the film feed roller, then first the toothed segment 83 returns under the action of the spring 88, but now with the accompanying movement of the pallet 86, since the oscillating bridge 87 by engagement through the pinion 87a, follows the movement of the mutilated gear wheel 6. The escapement 85 is here brought into engagement with the pallet 86. Now, on the release, under the action of the spring 11, the shutter disc will simultaneously spring back with the pin 73 fastened thereon, without any braking. The pin 73 abuts immediately upon the arc 89 of the toothed segment 83, whilst the slow slipping back of the toothed segment 83, retarded by the movement of the pallet, commences. When the pin 73 rests on the arc 89, the objective is opened. Only when the toothed segment 83 has slid back to such an extent that the pin 73 can drop from the arc 89, does the objective close. The tensioning of this brake device therefore takes place after each running down, simultaneously with the film feed.

With a camera which, as described, carries out its functions by stored spring energy, there must naturally be no waste of power. A loss of power would, however, take place if one of the hitherto usual devices for compensating the increasing spool circumference of the film-winding spool were used such as, for example, if the winding spools were slidably or resiliently mounted on a carrier core and, when the spool had assumed such a circumference that more film was wound up than was fed forward, the winding spool had to yield slidingly on its core. The expenditure of energy necessary thereto plays no part in the actuation of a camera by hand,—with the limited spring power of the camera here dealt with, however, a loss of power might lead to trouble in the feed.

Consequently, according to the present invention, there is used for this purpose a positive connection between the feed roller and the winding spool 49 (Fig. 2), for example by means of a toothed wheel transmission 50, 51, 52. The transmission ratio of this positive connection is, however, so selected that, at the commencement, less film is wound up than is fed forwards, so that the film is not wound up on the spool core in closely arranged turns. After a certain number of exposures, however, this ratio alters, since the circumference of the winding spool has, in the meantime, slowly become larger. Consequently, more film is now wound up than is fed forward by the feed roller. This cannot, however, now have a prejudicial effect since, according to the invention, the part of the film initially fed forward in excess and which is disposed on the spool core in loose turns is gradually wound up more tightly. In practice, it has been found that in this way a large number of exposures can be made without an elastic compensation being necessary which would weaken the available spring energy and would disturb the automatic feed.

By a suitable selection of the transmission ratio and of the ratio between the feed roller and the circumference of the film spool, it is possible to extend the limit of the use of this positive connection according to the invention to such an extent that the device can be used for the large number of exposures desired with small picture cameras.

This positive connection, which is so valuable for the automatic feed, between feed roller and film spool, can now be utilized, for the very reason that it is positive, in an extremely simple manner for the numbering of the exposures (see Fig. 2). If, for example, there is used on the film roller a toothed wheel 50 of 24 teeth and on the driver of the film spool a toothed wheel 52 of 25 teeth, then with every revolution of the film feed roller (which for example would correspond to a picture length), the position of the film spool driver will vary by one tooth. A number disc 1 fitted on the film driver or a marking arranged on this disc, would consequently be moved forward after each picture change by $\frac{1}{24}$ of the pitch circle. If there is arranged under the number disc a corresponding scale 54, the numbering device is complete. Since the toothed wheel transmission for the positive connection described must already exist, the complete numbering mechanism thus consists of only a single scale without any other parts whatever. The whole arrangement represents a considerable simplification of the total mechanism, since separate devices for the numbering mechanism and parts for compensating the increasing circumference of the film spool are superfluous.

Summarized, according to the arrangement outlined, therefore, after the spring is wound up, on pressing the release, first the shutter is released, that is the exposure is made, and then the following processes take place automatically and simultaneously on letting go the release: feed forward of the film, measuring off the picture length, winding up of the film, numbering the exposure, tensioning of the shutter, and tensioning of the time and brake mechanism.

Having now particularly described and ascertained the nature of my said invention and in what manner the same is to be performed I declare that what I claim is:—

1. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, a shutter in said casing and movable between set and idle positions of closing said aperture and opening the aperture as it moves, a shutter spring urging said shutter to idle position, and gearing for the shutter operable through the latch means by the feeding roll to move the shutter to set position and thereby tension the shutter spring, said latch means being associated with said gearing whereby the release of the latch permits the shutter to move from set to idle position.

2. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, and a second latch means operable upon release of the first latch means to hold the spring means inactive during the movement of the shutter from set to idle position.

3. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, and gearing for the shutter operable through the latch means by the feeding roll to move the shutter to set position and thereby tension the shutter spring, said latch means being associated with said gearing whereby the release of the latch permits the shutter to move from set to idle position.

4. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a braking mechanism for said spring means arranged to cause retardation in its action, a shutter in said casing and movable between set and idle positions of closing said aperture and opening the aperture as it moves, a shutter spring urging said shutter to idle position, and gearing for the shutter operable through the latch means by the feeding roll to move the shutter to set position and thereby tension the shutter spring, said latch means being associated with said gearing whereby the release of the latch permits the shutter to move from set to idle position.

5. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a braking mechanism for said spring means arranged to cause retardation in its action, and a second latch means operable upon release of the first latch means to engage said braking mechanism and prevent operation of the spring means during the movement of the shutter from set to idle position.

6. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, an escapement mechanism geared to said spring means to cause retardation in the action of the spring means, and a second latch means operable upon release of the first latch means to engage said escapement mechanism and prevent operation of the spring means during the movement of the shutter from set to idle position.

7. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a braking mechanism for said spring means arranged to cause retardation in its action, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, and a second latch means operable upon release of the first latch means to engage said braking mechanism and prevent operation of the spring means during the movement of the shutter from set to idle position.

8. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, an escapement mechanism for said spring means arranged to cause retardation in its action, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, and a second latch means operable upon release of the first latch means to engage said escapement mechanism and prevent operation of the spring means during the movement of the shutter from set to idle position.

9. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, a shutter in said casing and movable between set and idle positions of closing said aperture and opening the aperture as it moves, a shutter spring urging said shutter to idle position, and gearing for the shutter operable through the latch means by the feeding roll to move the shutter to set position and thereby tension the shutter spring, said latch means being associated with said gearing whereby the release of the latch permits the shutter to move from set to idle position, a shutter controlling brake means to control the speed of movement of said shutter from set to idle position, and means to adjust said shutter controlling brake means to various speeds for said shutter.

10. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a second latch means operable upon release of the first latch means to hold the spring means inactive during the movement of the shutter from set to idle position, a shutter controlling brake means to control the speed of movement of said shutter from set to idle position, and means to adjust said shutter controlling brake means to various speeds for said shutter.

11. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a shutter controlling brake means to control the speed of movement of said shutter from set to idle position, and means to adjust said shutter controlling brake means to various speeds for said shutter.

12. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a braking mechanism for said spring means arranged to cause retardation in its action, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a shutter controlling brake means to control the speed of movement of said shutter from set to idle position, and means to adjust said shutter controlling brake means to various speeds for said shutter.

13. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a braking mechanism for said spring means arranged to cause retardation in its action, a second latch means operable upon release of the first latch means to engage said braking mechanism and prevent operation of the spring means during the movement of the shutter from set to idle position, a shutter controlling brake means to control the speed of movement of said shutter from set to idle position, and means to adjust said shutter controlling brake means to various speeds for said shutter.

14. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, an escapement mechanism geared to said spring means to cause retardation in the action of the spring means, a second latch means operable upon release of the first latch means to engage said escapement mechanism and prevent operation of the spring means during the movement of the shutter from set to idle position, a shutter controlling brake means to control the speed of movement of said shutter from set to idle position, and means to adjust said shutter controlling brake means to various speeds for said shutter.

15. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism, normally holding said feeding roll from rotation, manually operable means connected to the latch mechanism to release the same, gearing connecting said feeding roll and winding roll, a braking mechanism for said spring means arranged to cause retardation in its action, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a second latch means operable upon release of the first latch means to engage said braking mechanism and prevent operation of the spring means during the movement of the shutter from set to idle position, a shutter controlling brake means to control the speed of movement of said shutter from set to idle position, and means to adjust said shutter controlling brake means to various speeds for said shutter.

16. In a film camera having a casing provided with a lens aperture, a winding roll for film revolubly mounted in said casing at one side of the aperture, and means to support a roll of unexposed film at the other side of the aperture; the combination of a film feeding roll mounted in said casing between the winding roll and said means, spring means urging the feeding roll to rotate, a releasable latch mechanism normally holding said feeding roll from rotation, manually operable means connected to the latch mechanism to release the same, gearing connecting said feeding roll and winding roll, an escapement mechanism for said spring means arranged to cause retardation in its action, a shutter in said casing and movable between set and idle positions of closing said aperture and opening the aperture as it moves, a shutter spring urging said shutter to idle position, gearing for the shutter operable through the latch means by the feeding roll to move the shutter to set position and thereby tension the shutter spring, said latch means being associated with said gearing whereby the release of the latch permits the shutter to move from set to idle position, a second latch means operable upon release of the first latch means to engage said escapement mechanism and prevent operation of the spring means during the movement of the shutter from set to idle position, a shutter controlling brake means to control the speed of movement of said shutter from set to idle position, and means to adjust said shutter controlling brake means to various speeds for said shutter.

HEINZ KILFITT.